US012779922B2

(12) United States Patent
Torok

(10) Patent No.: US 12,779,922 B2
(45) Date of Patent: Nov. 3, 2026

(54) AUTOMOTIVE AMPHIBIAN TRAILER ASSEMBLY

(71) Applicant: Laszlo Torok, Currumbin Waters (AU)

(72) Inventor: Laszlo Torok, Currumbin Waters (AU)

( * ) Notice: Subject to any disclaimer, the term of this patent is extended or adjusted under 35 U.S.C. 154(b) by 377 days.

(21) Appl. No.: 18/535,091

(22) Filed: Dec. 11, 2023

(65) Prior Publication Data

US 2024/0190194 A1 Jun. 13, 2024

(30) Foreign Application Priority Data

Dec. 13, 2022 (AU) ................................ 2022903807

(51) Int. Cl.

*B60F 3/00* (2006.01)
*B60D 1/167* (2006.01)
*B63B 7/08* (2020.01)
*B63B 39/03* (2006.01)

(52) U.S. Cl.

CPC .......... *B60F 3/0092* (2013.01); *B60D 1/1675* (2013.01); *B60F 3/0007* (2013.01); *B60F 3/0038* (2013.01); *B63B 7/082* (2013.01); *B63B 39/03* (2013.01)

(58) Field of Classification Search

CPC .... B60F 3/0092; B60F 3/0007; B60F 3/0038; B60D 1/0075

See application file for complete search history.

(56) References Cited

U.S. PATENT DOCUMENTS

| | | | | |
|---|---|---|---|---|
| 3,779,574 | A * | 12/1973 | Ow | B60F 3/0092 280/43.18 |
| 8,454,399 | B1 * | 6/2013 | Zelechonok | B60F 3/0069 440/12.51 |
| 2002/0134295 | A1 * | 9/2002 | Chimato | B63B 17/02 114/344 |
| 2008/0047481 | A1 * | 2/2008 | Maarschalkerweerd | B60F 3/0092 114/344 |
| 2018/0334000 | A1 * | 11/2018 | Lazarevis | B60D 1/06 |

FOREIGN PATENT DOCUMENTS

| | | | | |
|---|---|---|---|---|
| CA | 2311739 | C * | 11/2009 | B63B 23/30 |
| CA | 2873851 | A1 * | 11/2013 | B63B 1/042 |
| ES | 2357706 | A1 * | 4/2011 | B63B 7/02 |
| FR | 2680144 | A1 * | 2/1993 | B60F 3/0092 |
| WO | WO-9937493 | A1 * | 7/1999 | B63H 21/175 |
| WO | WO-2014100568 | A1 * | 6/2014 | B63B 1/042 |
| WO | WO-2017214667 | A1 * | 12/2017 | B60F 3/003 |

* cited by examiner

*Primary Examiner* — S. Joseph Morano
*Assistant Examiner* — Jovon E Hayes
(74) *Attorney, Agent, or Firm* — Tucker Ellis LLP

(57) ABSTRACT

Provided is an automotive amphibian trailer assembly. The assembly includes a trailer for being towed by a vehicle, and upon which the vehicle can be loaded. Further, the assembly includes inflatable means for inflating to float the loaded trailer on water. Advantageously, the inflatable means may be releasable from the trailer so that the trailer can be readily used for purposes other than carrying the vehicle (e.g. carrying soil) and/or made more compact for storage (e.g. in a home garage).

20 Claims, 2 Drawing Sheets

AUTOMOTIVE AMPHIBIAN TRAILER ASSEMBLY

TECHNICAL FIELD

The present invention relates to an automotive amphibian trailer assembly.

BACKGROUND

The reference to any prior art in this specification is not, and should not be taken as an acknowledgement or any form of suggestion that the prior art forms part of the common general knowledge.

Vehicle ferries are known for transporting vehicles across water. In practice, utilization of such ferries are restrictive as they are expensive to use, often booked out and, in any event, operate according to infrequent scheduling which may not suit the user.

Personal vehicle barges are known which provide more flexibility and address the issues above, although are undesirably confined to the water and need to be moored when not in use.

Purpose-built automotive amphibian trailers for carrying vehicles are known, although are undesirably bulky in practice and take up significant storage room.

The preferred embodiment provides an improved automotive amphibian trailer assembly.

SUMMARY OF THE INVENTION

According to one aspect of the present invention, there is provided an automotive amphibian trailer assembly including:

a trailer for being towed by a vehicle, and upon which the vehicle can be loaded; and inflatable means for inflating to float the loaded trailer on water.

Advantageously, the inflatable means may be releasable from the trailer so that the trailer can be readily used for purposes other than carrying the vehicle (e.g. carrying soil) and/or made more compact for storage (e.g. in a home garage).

The trailer may include a towbar by which it is towed by the vehicle. The towbar may be retractable. The towbar may be retracted upright when floating the loaded trailer. The towbar may be pivotally mounted. The trailer may include a hull, preferably formed of metal (e.g. aluminium), Glass Reinforced Plastic (GRP), molded plastic material or wood. The hull may define one or more lateral door spaces to facilitating opening of a door of the loaded vehicle into the space. The assembly may one or more lateral panels which can close respective door spaces. Each lateral panel may fold outwardly, and be optionally hinged to the hull. The assembly may include one or more water seals. The seals may be located to seal openings in the hull, such as openings adjacent a ramp or panel.

The trailer may include a motor for propelling the assembly across the water. The motor may be either propeller-driven or operate by way of water jet propulsion. The trailer may include a fastening means for an outboard motor. The trailer may include the outboard motor. Alternatively, the trailer may include an inboard motor. The trailer may include motor controls for powering a motor, and steering controls for steering the floating trailer. The trailer may include one or more fuel tanks. Each fuel tank may be located on the underside of the trailer to facilitate buoyancy of the assembly.

The trailer may include a ramp for loading the vehicle onto the trailer. The ramp may be retractable. The ramp may be retracted upright when floating the loaded trailer. The ramp may be pivotally mounted. The ramp may be inflatable or hard material, such as aluminum. The trailer may include a floor upon which the vehicle is loaded. The trailer may include one or more buoyancy chambers beneath the floor. The trailer may define one or more drains so that water in the trailer can drain into the buoyancy chambers. The assembly may include a pump for pumping water from the buoyancy chambers. The buoyancy chambers may include a fuel tank and/or dry storage. The trailer may form a subsea catamaran.

The inflatable means may include one or more inflatable floats (or pontoons), and optionally a quartet of floats located at sides of the trailer. The floats may be elongate. The floats may be cylindrical, or have a streamlined or tapered shape. The floats may be separated along the trailer. The floats may be deflated and compacted to be stored on the trailer when the trailer is being towed. The assembly may float without the floats attached and vehicle loaded, and so may still be used with lighter loads such as carrying one or more people for fishing. The floats may be formed of pliant material. The floats may be stored in lockers on the outside of the trailer. The lockers may include doors which open when the floats are inflated.

The trailer may be sized to load a single vehicle only. The vehicle may be a car, or a truck.

The trailer assembly may include a winch to assist with loading the vehicle. The winch may be electrically powered or manually operated.

The trailer may include wheels. The wheels may be located between floats of the inflatable means. The wheels may be accessible between the floats. The wheels may be retractable and/or lifted up after floating the trailer in the water. The wheels may be electrically or hydraulically powered, or manually operated. The wheels may be fixed.

According to another aspect of the present invention, there is provided an automotive amphibian trailer method including:

towing a trailer with a vehicle that can be loaded on the trailer; and inflating inflatable means for floating the loaded trailer on water.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a drawing as follows.

DETAILED DESCRIPTION OF PREFERRED EMBODIMENTS

Figure 1:
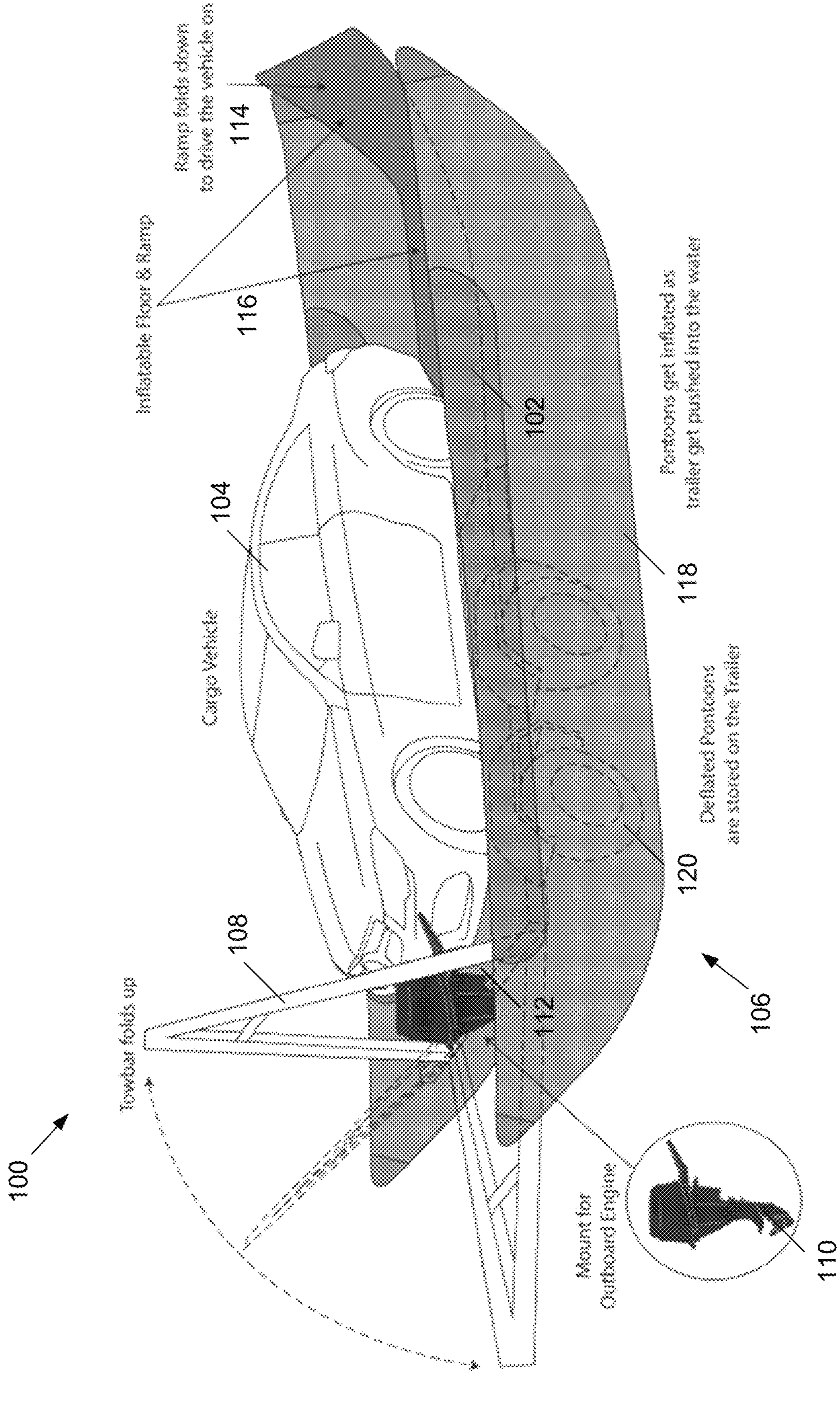
FIG. 1 is a schematic upper perspective drawing of an automotive amphibian trailer assembly in accordance with an embodiment of the present invention.

According to an embodiment of the present invention, there is provided an automotive amphibian trailer assembly 100 as shown in FIG. 1. The personal trailer assembly 100 includes a trailer 102 for being towed by a vehicle 104 (i.e. automobile), and upon which the vehicle 104 can be loaded. The trailer assembly 100 also includes inflatable means 106 for inflating to float the loaded trailer 102 on water.

Advantageously, the inflatable means 106 is releasable from the trailer 102 so that the multi-purpose trailer 102 can be readily used for purposes other than carrying the vehicle 104 (e.g. carrying soil) and made more compact for storage in a home garage.

The trailer 102 includes a front towbar 108 by which it is towed by the vehicle 104. The towbar 108 is pivotally mounted to a chassis of the trailer 102. The towbar 108 can be retracted upright when floating the loaded trailer, or extended horizontally during towing.

The trailer assembly 100 also includes a motor 110 for propelling the assembly 100 across the water. The trailer 102 includes a front fastening bracket 112 for fastening the outboard motor 110.

The trailer 102 also includes a rear ramp 114 for loading the vehicle onto the trailer. The ramp 114 is pivotally mounted to a chassis of the trailer 102. The ramp 114 can be retracted upright when floating the loaded trailer 102, or extended downwards so that the vehicle 104 can be driven onto the trailer 102. The ramp 114 can be inflatable, or hard material such as aluminum. The trailer 102 can also include a floor 116 which can be hard material, such as aluminum, or inflatable and upon which the vehicle is loaded.

The inflatable means 106 includes a pair of inflatable floats 118 (or pontoons) located on either side of the trailer 102. The floats 118 are elongate, and at least as long as the trailer 102. The floats 118 can be made as one long section, per side, including covering wheels area or can include two or more floats per side. The released floats 118 can be deflated and compacted to be stored on the trailer 102 when the trailer is being towed. The floats 118 are formed of pliant material which can be folded or rolled.

The trailer 102 also includes wheels 120 for retracting and lifting up after floating the trailer 102 in the water. The wheels 120 are electrically or hydraulically powered, or manually operated, or fixed.

The trailer 102 is sized to load a single vehicle only.

An method for using the trailer 102 is briefly described.

First, the vehicle 104 tows the trailer 102 to water. The deflated floats 118 and motor 110 are stored on the trailer 102 during towing.

Next, the trailer 102 is backed toward the water on a boat ramp. Once near (or in) the shallows, the floats 118 are fully inflated on the sides of the trailer 102. The inflatable means 106, including floats 118, are inflated before the trailer 102 is backed into the water. The floats 118 are preferably attached by very heavy duty ties at anchor points at all times, rather than attached when arriving at the water. Floats 118 need only be taken off for maintenance or if not wanting to carry heavy loads.

Once the inflatable means 106 is fully inflated, the assembly is backed into the water and the vehicle 104 is decoupled from the trailer 102. The towbar 108 is retracted upwards, and the motor 110 is fastened to the fastening bracket 112 of the trailer 102. The floating assembly 100 is then rotated 180 degrees, either manually or using the motor 110, so that the ramp 114 is proximal the shore and faces land where the vehicle 104 is located.

The ramp 114 folds down so that the vehicle 104 can then be driven and loaded on the trailer 102. The inflatable means 106 now floats the loaded trailer 102 on the water, and the ramp 114 can be retracted upwards.

A user can then use the motor 110 to propel the vehicle 104, on the floating trailer 102, over the water to a desired location.

Once completed, the reverse steps can be performed to tow the trailer assembly 100 away.

According to another embodiment of the present invention, there is provided an automotive amphibian trailer assembly 100 as shown in FIG. 2. Like reference numerals refer to like features previously described.

Figures 2A, 2B:
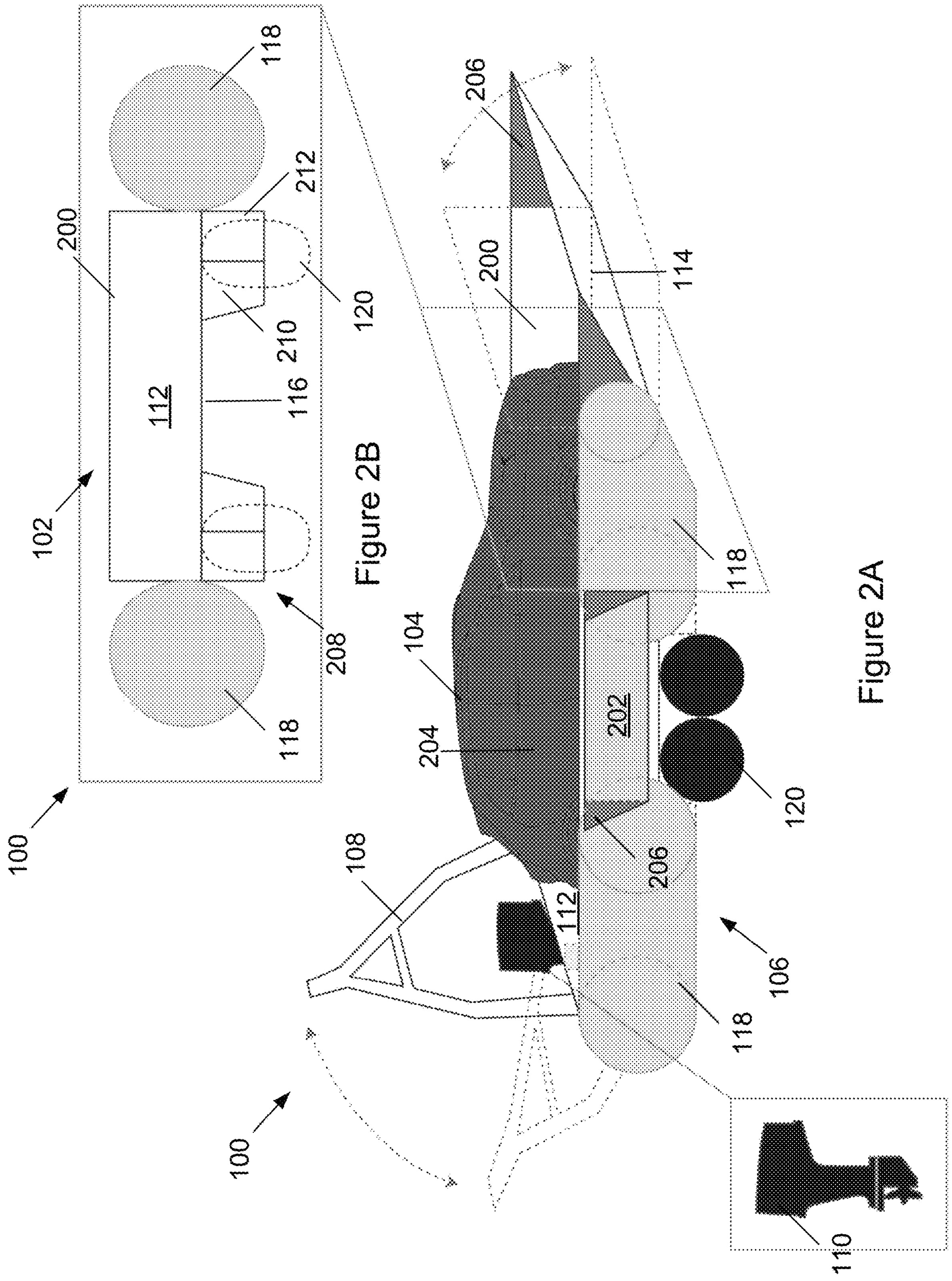
FIG. 2A is a schematic upper perspective drawing of an automotive amphibian trailer assembly in accordance with another embodiment of the present invention.
FIG. 2B is a schematic end drawing of the automotive amphibian trailer assembly of FIG. 2A.

With reference to FIG. 2A, the trailer 102 includes a box-like hull 200 forming the chassis of the trailer 102. The hull 200 includes the hinged ramp 114 at one end, a motor mounting wall 112 at the other end, and a pair of side walls extending there-between. The side walls of the hull 200 define one or more cutout door spaces, closed by lateral panels 202, to facilitating opening of the doors 204 of the loaded vehicle 104 into the open spaces. Each lateral panel 202 is hinged to the hull 200 at its base and folds outwardly.

The assembly 100 also includes water seals 206 located to seal openings in the hull 200, such as slit openings adjacent and on either side of the lateral panels 202 and the ramp 114. The seals 206 are formed of the same or similar heavy duty fabric material as the floats 118, and so are flexible and pliant.

The assembly 100 includes a quartet of elongate floats 118 located at corners sides of the trailer 102. The rear floats 118 near the motor 110 are cylindrical, whereas the front floats 118 near the ramp 114 are streamlined or tapered in shape. On each side, the floats 118 are separated along the trailer 102. The exposed wheels 120 are fixed, and located between the floats 118 so that they are accessible from the side.

As can best be see in in FIG. 2B, the trailer 102 forms a subsea catamaran to reduce drag in the water. The hull 200 includes a panel floor 116 upon which the vehicle 104 is loaded. The trailer 102 includes a pair of elongate lateral stores 208, with two pods each, extending beneath the floor 116 to provide directional stability for the assembly 100 under way on the water.

Each store 208 defines an inner buoyancy chamber 210 beneath the floor 116. The buoyancy chambers 210 include a fuel tank and/or dry storage. The trailer 200 defines drains so that water in the trailer 200 can drain into the buoyancy chambers 210 in the event that a wave swamps the assembly 100. The assembly 100 also includes an emergency bilge pump for pumping water from the buoyancy chambers 210.

Each store 208 also defines an outer float locker 212 for storing the deflated floats 118. The lockers 212 also house anchor points for the floats 212 and built in inflating hoses for inflating the floats 212. The wet lockers 212 include doors which open and fold up against the hull 200 when the floats 118 are inflated.

The durable hull 200 is formed of metal (e.g. aluminium), Glass Reinforced Plastic (GRP), molded plastic material or wood. The assembly 100 can float without the floats 118 attached and vehicle 104 loaded, and so may still be used with lighter loads such as carrying one or more people for fishing. The hull 200 itself is boat hull.

The trailer 200 is not more than 6 m long×2.5 m wide, to comply with Australian road requirements. This means loading a Ford Ranger or similar car 104, the assembly weight is about 3.2 tons plus 1 ton cargo including people, say 5 ton. To meet the minimum Australian marine regulations for water use as a barge, the assembly 100 should have at least plus 100% buoyancy than load. Therefore, the assembly 100 is preferably rated at 11 tons including weight of the trailer 102 itself at 1 ton.

The assembly 100 will float, and with 5 ton loaded Floats 118 are fully inflated, and the assembly will float with great stability to be seaworthy in semi sheltered waters as Great Barrier Reef or Bahamas—Caribbean Islands on days of moderate weather. Side floats 118 also provide wave breaking effect to keep inside of assembly free of water and reduce spray.

In order to safely load the vehicle 104 on a shallow boat ramp or beach, the loading ramp 114 may be 1.5 m long, plus a fold out second section of 1.5 m, bringing the total ramp length to 3 m total.

A person skilled in the art will appreciate that many embodiments and variations can be made without departing from the ambit of the present invention.

The trailer assembly can be made in various sizes, and varied to suit vehicles from small cars to large trucks.

The trailer assembly 100 may include a winch mounted to the front to the trailer 102, to assist with loading the vehicle 104. The winch may be electrically powered or manually operated.

The trailer 102 can include an inboard motor. The trailer 102 can include motor controls for powering a motor, and steering controls for steering the floating trailer 102. The motor can be either propeller-driven or operate by way of water jet propulsion.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. An automotive amphibian trailer assembly including:
a trailer for being towed by a vehicle, and upon which the vehicle can be loaded; and
an inflatable arrangement for inflating to float the loaded trailer on water;
wherein the trailer is sized to load a single vehicle only, and includes a retractable ramp for loading the vehicle onto the trailer.

2. An automotive amphibian trailer assembly as claimed in claim 1, wherein the inflatable arrangement is releasable from the trailer so that the trailer can be readily used for purposes other than carrying the vehicle and/or made more compact for storage.

3. An automotive amphibian trailer assembly as claimed in claim 1, wherein the trailer includes a retractable towbar by which it is towed by the vehicle, the towbar being retracted upright when floating the loaded trailer.

4. An automotive amphibian trailer assembly as claimed in claim 1, wherein the hull defines one or more lateral door spaces to facilitating opening of a door of the loaded vehicle into the space.

5. An automotive amphibian trailer assembly as claimed in claim 4, wherein the assembly includes one or more lateral panels which can close respective door spaces, each lateral panel folding outwardly and being hinged.

6. An automotive amphibian trailer assembly as claimed in claim 1, including one or more water seals located to seal openings in the hull, the openings being adjacent a ramp or panel.

7. An automotive amphibian trailer assembly including:
a trailer for being towed by a vehicle, and upon which the vehicle can be loaded; and
an inflatable arrangement for inflating to float the loaded trailer on water, wherein the trailer includes a floor upon which the vehicle is loaded, and one or more buoyancy chambers beneath the floor.

8. An automotive amphibian trailer assembly as claimed in claim 7, wherein the trailer defines one or more drains so that water in the trailer can drain into the buoyancy chambers.

9. An automotive amphibian trailer assembly as claimed in claim 8, including a pump for pumping water from the buoyancy chambers.

10. An automotive amphibian trailer assembly as claimed in claim 7, wherein the buoyancy chambers include a fuel tank and/or dry storage.

11. An automotive amphibian trailer assembly as claimed in claim 1, wherein the trailer forms a subsea catamaran, in use.

12. An automotive amphibian trailer assembly as claimed in claim 1, wherein the inflatable arrangement includes one or more inflatable floats, or a quartet of floats located at corners or—sides of the trailer.

13. An automotive amphibian trailer assembly as claimed in claim 12, wherein the floats are elongate, cylindrical, and/or have a streamlined or tapered shape.

14. An automotive amphibian trailer assembly as claimed in claim 12, wherein the floats are separated along the trailer to access wheels.

15. An automotive amphibian trailer assembly as claimed in claim 12, wherein the floats can be deflated and compacted to be stored on the trailer when the trailer is being towed.

16. An automotive amphibian trailer assembly as claimed in claim 12, wherein the assembly can float without the floats attached and vehicle loaded, and so can still be used when carrying lighter loads than a vehicle including one or more people.

17. An automotive amphibian trailer assembly as claimed in claim 12, wherein the floats are stored in lockers on the outside of the trailer, the lockers including doors which open when the floats are inflated.

18. An automotive amphibian trailer assembly as claimed in claim 1, wherein the trailer includes:
a motor for propelling the assembly across the water; and
one or more fuel tanks located on the underside of the trailer to facilitate buoyancy of the assembly.

19. An automotive amphibian trailer method using the automotive amphibian trailer assembly claimed in claim 1, the method including:
towing the trailer with the vehicle that can be loaded on the trailer; and
inflating the inflatable arrangement for floating the loaded trailer on water.

20. An automotive amphibian trailer assembly including:

a trailer for being towed by a vehicle, and upon which the vehicle can be loaded; and an inflatable arrangement for inflating to float the loaded trailer on water;

wherein:

(a) the trailer includes a retractable towbar by which it is towed by the vehicle, the towbar being retracted upright when floating the loaded trailer;

(b) the hull defines one or more lateral door spaces to facilitate opening of a door of the loaded vehicle into the space;

(c) the automotive amphibian trailer assembly includes one or more water seals located to seal openings in the hull, the openings being adjacent a ramp or panel;

(d) the inflatable arrangement includes one or more inflatable floats, or a quartet of floats located at corners or sides of the trailer, the floats being stored in lockers on the outside of the trailer, the lockers including doors which open when the floats are inflated; or (e) the trailer includes:

a motor for propelling the assembly across the water; and one or more fuel tanks located on the underside of the trailer to facilitate buoyancy of the assembly.

* * * * *